(12) United States Patent
Strietzel (10) Patent No.: US 6,950,804 B2
(45) Date of Patent: Sep. 27, 2005

(54) SYSTEMS AND METHODS FOR DISTRIBUTING TARGETED MULTIMEDIA CONTENT AND ADVERTISING

(75) Inventor: Jonathan Strietzel, Long Beach, CA (US)

(73) Assignee: Pika Media, Long Beach, CA (US)

( * ) Notice: Subject to any disclaimer, the term of this patent is extended or adjusted under 35 U.S.C. 154(b) by 708 days.

(21) Appl. No.: 09/793,939

(22) Filed: Feb. 26, 2001

(65) Prior Publication Data

US 2002/0120564 A1 Aug. 29, 2002

(51) Int. Cl.7 ............................................. G06F 17/60
(52) U.S. Cl. ........................... 705/26; 705/14; 705/27; 705/10; 705/75; 709/217; 709/218; 709/229; 713/164; 713/176; 707/10; 715/733
(58) Field of Search ............................. 705/10, 14, 26, 705/27, 75; 707/10; 709/217, 218, 229; 713/164, 176; 715/733; 725/32

(56) References Cited

U.S. PATENT DOCUMENTS

| | | | | |
|---|---|---|---|---|
| 5,594,779 A | | 1/1997 | Goodman ..................... | 379/59 |
| 5,694,455 A | | 12/1997 | Goodman ..................... | 379/59 |
| 5,708,780 A | * | 1/1998 | Levergood et al. ......... | 709/229 |
| 5,740,549 A | | 4/1998 | Reilly et al. .................. | 704/14 |
| 5,794,210 A | | 8/1998 | Goldhaber et al. ........... | 705/14 |
| 5,808,224 A | | 9/1998 | Kato ............................. | 84/609 |
| 5,915,238 A | | 6/1999 | Tjaden ......................... | 704/260 |
| 5,931,901 A | | 8/1999 | Wolfe et al. ................. | 709/206 |
| 5,933,811 A | * | 8/1999 | Angles et al. ................ | 705/14 |
| 5,948,061 A | | 9/1999 | Merriman et al. .......... | 709/219 |
| 5,959,945 A | | 9/1999 | Kleiman ....................... | 369/30 |
| 6,029,064 A | | 2/2000 | Farris et al. ................. | 455/412 |
| 6,038,591 A | | 3/2000 | Wolfe et al. ................. | 709/206 |
| 6,119,098 A | | 9/2000 | Guyot et al. .................. | 705/14 |
| 6,128,663 A | | 10/2000 | Thomas ....................... | 709/228 |
| 6,161,142 A | | 12/2000 | Wolfe et al. ................. | 709/230 |
| 6,182,050 B1 | | 1/2001 | Ballard ......................... | 705/14 |
| 6,216,129 B1 | * | 4/2001 | Eldering ....................... | 707/10 |
| 6,268,856 B1 | * | 7/2001 | Bruck et al. ................. | 715/733 |
| 6,718,551 B1 | * | 4/2004 | Swix et al. ................... | 725/32 |
| 2002/0016736 A1 | * | 2/2002 | Cannon et al. ............... | 705/14 |
| 2002/0095390 A1 | * | 7/2002 | Hovsepian ................... | 705/75 |
| 2002/0095571 A1 | * | 7/2002 | Bradee ........................ | 713/164 |
| 2003/0149738 A1 | * | 8/2003 | Jacobs et al. ............... | 709/217 |

FOREIGN PATENT DOCUMENTS

WO      WO 01/009771 A1 *  2/2001   ........... G06F/17/30

OTHER PUBLICATIONS

Sandberg, Jared; "Compuserve targets business users with new web–based on–line service"; Asian Wall Street Journal; New York; Oct. 15, 1997; p. 9, extracted from proquest database on Internet on Jun. 25, 2004.*

Press release; from Business Editors and Internet/On–line Writers; Tritium Network Launches Free Internet Service in Houston; Business Wire; New York; May 15, 1998; p. 1; extracted from proquest database on Internet on Jun. 25, 2004.*

* cited by examiner

Primary Examiner—Yogesh C. Garg
(74) Attorney, Agent, or Firm—Baker & McKenzie (57) ABSTRACT

A method of delivering content from a content delivery system to a user's terminal over a communication link that provides users with flexibility in determining how to pay for content, one option being to receive targeted advertising with the content. Other options presented to the user involve various methods of paying for limited or unlimited access to the content. Therefore, the status in terms of whether access is free for each available content item relative to each user is tracked using a tracking database.

13 Claims, 5 Drawing Sheets

SYSTEMS AND METHODS FOR DISTRIBUTING TARGETED MULTIMEDIA CONTENT AND ADVERTISING

BACKGROUND OF THE INVENTION

1. Field of the Invention

The present invention relates generally to multimedia distribution and, more particularly, to systems and methods for providing targeted multimedia content and advertising.

2. Background

There are several models for Internet distribution of digital multimedia content and each model has its own problems. One model is the pay and download model. In this model, the consumer can access a website and request that certain content, i.e., a song or a video clip, be downloaded, for a fee, to the consumer's computer. Typically, these sites offer samples of the content, which can be downloaded and played for free. The samples allow the consumer to determine if he wants to purchase the content. A first problem with this model, for consumers who want free access to content, is that the content is not free. A second problem is that even though the consumer owns a copy of the content item that is downloaded to his computer, encryption, license keys, etc., make it difficult for the consumer to copy the item to a portable device. And if the content item is not encrypted, or if a license key is not required, then there is a potential for unauthorized copying of the content item. Additionally, even if the content item can be copied to a portable device, there are still problems related to portability, which will be addressed below.

A related but alternative model to the pay and download scheme is the pay per access scheme. In this scheme, the consumer pays a fee and the content is streamed to the consumers computer or other device used to access the content. When content is streamed, no copy is made in the accessing device. Therefore, the consumer has to access the content and pay the fee each time the consumer wants to play the content item. The accessing device can be a computer, but it could also be, for example, a settop box used to access movies or television programming. Streaming does not require much memory in the accessing device; therefore, the consumer typically does not need to worry about whether the device has enough memory to store lots of content. Also, because they do not require lots of memory, the devices can be made smaller and cost efficient. But streaming is bandwidth intensive; therefore, it may not be acceptable in certain situations. Moreover, the content is not portable, because the consumer does not receive a copy that they can then copy into a portable device or storage medium.

Another model for Internet distribution is the file sharing model. Services operating under this model have many problems, some of them well publicized. In the file sharing model, users can store, access, and share content that they have already purchased. Two major problems with these type of services are unauthorized copying and working out how the content producers will be paid for the use of their content. For example, one such service copied songs from thousands of CDs into a storage medium. Users were then allowed access to songs that corresponded to songs on CDs the user had already purchased. In order to verify that the user had purchased a CD, the user was required to put the CD into the CD ROM drive of his computer. The servers used to run the service also ran software that allowed them to verify the CD in the user's CD ROM drive. Once verified, the user could access from the storage medium copies of the songs on the CD. Unfortunately, the copying of the thousands of CDs was unauthorized and amounted to an infringement of the copyright for each song. Another file sharing site allowed users to copy music files from each other's computer hard drives, leading to rampant copyright infringement.

One solution aimed at alleviating these problems is for file sharing sites to use "lockers" in which a user can arrange music or other content, which they have purchased. The user can then store, organize, and access their content from their computer, or from any computer anywhere. The main problem with this model is that the site operator needs to make money. Therefore, in one example, the user is charged each time he accesses content in his locker. But this means that the user is charged for accessing content that the user already owns. An alternative, of course, is to use advertisements to subsidize the cost of the service. But Internet advertising, such as banner ads, are notoriously ineffective. This is because users tend to ignore the advertising. Moreover, while the user is not forced to pay to access his own content, he is subjected to unwanted advertising in order to access content that the user already owns.

Another problem with digital content is realizing the benefits of portability. It is inconvenient and sometimes impossible to take a computer, even a laptop computer, with you. So while services like those discussed offer users the convenience of being able to access their digital content from anywhere, sometimes accessing the content is just not possible. For example, if a user would like to listen to music while he exercises, such a service would not be of any benefit. Portable devices designed to store digital music do exist; however, they have several drawbacks as well. For example, such devices typically require songs to be downloaded from a computer, which means buying cumbersome and/or expensive cables and software for interfacing the device to a computer. Also, these devices typically have a limited amount of memory to store songs, which requires the user to constantly update the songs stored on the device.

One way to overcome the problems with the portable devices is to employ wireless distribution of digital content. Wireless distribution has several drawbacks, however. First, Wireless portable devices used to receive wirelessly distributed content do not presently have sufficient memory to download content to the device. As a result, the content is typically streamed, but streaming requires high bandwidth. In most wireless systems, bandwidth is limited and extremely valuable. This leads to a second problem—the cost of such services. Wireless distribution of content must be paid for; therefore, the user will either be subjected to an unwanted fee or unwanted advertising.

SUMMARY OF THE INVENTION

In order to overcome the problems associated with present methods of delivering content, the systems and methods for distributing targeted multimedia content and advertising provide users with flexibility in determining how to pay for content, one option being to receive targeted advertising with the content. Other options presented to the user involve various methods of paying for limited or unlimited access to the content. Therefore, the status in terms of whether access is free for each available content item relative to each user is tracked using a tracking database.

As such, in one aspect of the invention there is presented a method of delivering content from a content delivery system to a user's terminal over a communication link. The method comprises: (a) receiving a request from a user of the content delivery system to download a content item to the user's terminal over the communications link; (b) checking the status of the content item relative to the user in order to determine if access to the content item by the user is free; (c) in response to the status check, providing at least two payment options to the user if the results of the status check indicate that access to the content item is not free for the user, one of the payment options being the option to receive advertising with the content item in lieu of paying money to receive the content item; (d) receiving a payment option selection from the user; (e) preparing the content item for download in accordance with the selected payment option, wherein preparation of the content item for downloading includes appending a targeted advertisement to the content item when the user selects to receive advertising as the payment option; and (f) downloading the prepared content item from the content delivery system to the user's terminal over the communications link.

In another aspect of the invention there is presented a content delivery system that includes an advertising database configured to store a plurality of advertisements, a content database configured to store a plurality of content items, and the tracking database configured to track a status of each of the plurality of content items relative to each of a plurality of users. The content server is configured to receive a request for a content item stored in the content database from one of the plurality of users, check a status stored in the tracking database for the requested content item relative to the requesting user, append an advertisement to the content item if required based on the status, and download the content item and any appended advertisement to the requesting user.

Further features and advantages of this invention as well as the structure of operation of various embodiments are described in detail below with reference to the accompanying drawings.

BRIEF DESCRIPTION OF THE DRAWINGS

Preferred embodiments of the inventions taught herein are illustrated by way of example, and not by way of limitation, in the figures of the accompanying drawings, in which similar elements in the different embodiments are referred to by the same reference numbers for ease in illustration, and in which:

FIG. 3 is a flow chart illustrating a process for selecting how access to content stored on a content delivery system, such as the system illustrated in FIG. 1, is to be paid for.

DETAILED DESCRIPTION OF PREFERRED EMBODIMENTS

The ideal compromise that takes into consideration all of the concerns regarding distribution of digital content is to provide a service that allows users to organize content that can be accessed anywhere, anytime, via a fixed or wireless communication link. The cost of the services being subsidized by short, highly targeted advertisements that are in the same format as, and that are strategically appended to each content item, preferably to the front or back of each content item. Therefore, the user cannot ignore the advertisement, but the advertisement is unobtrusive and of interest to the user. To avoid bandwidth issues, the content can be downloaded to the accessing device. In order to avoid unwanted copying, however, the content is preferably not permanently stored in the accessing device. Instead, the device preferably only temporarily stores the content long enough to play it.

To make the advertising even less obtrusive, the service can track, for a particular user, how many times an advertisement has been associated with a particular content item. Once a sufficient amount of advertising has been received in relation to that particular content item, then advertisements may no longer be associated when that item is accessed by the particular user. Thus, for example, advertisements could only be added when a user accesses a particular content item for the first time, and possibly a few subsequent times. To provide the user with flexibility, other payment methods can also be provided. For example, rather than receiving an advertisement with the content item, the service may provide the user with the option to purchase the content item. Once purchased, the user would have free access to that content item thereafter. Alternatively, the user can select to pay for just one download, or to purchase a subscription that covers the content item. In this manner, the systems and methods for distributing targeted multimedia content and advertising provide flexibility to the user to determine the payment method for different content.

Figure 1:
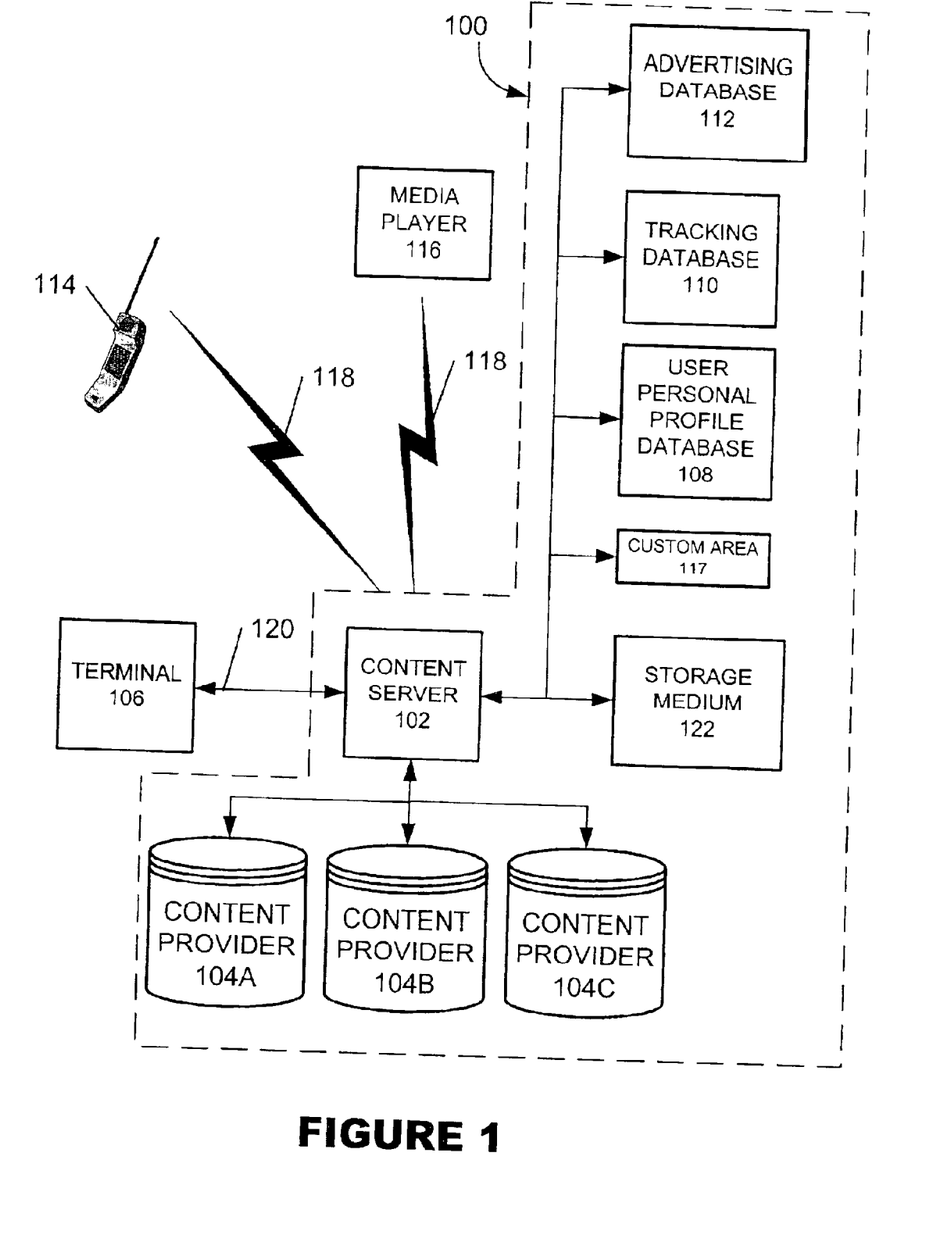
FIG. 1 is a block diagram illustrating an exemplary content delivery system in accordance with one embodiment of the inventions.

FIG. 1 illustrates an example architecture for a content delivery system 100 designed to provide such a service. System 100 is run by content servers of which server 102 is a representative example. Depending on the number and location of users, system 100 can employ one or several content servers 102. System 100 also includes a storage medium 122. Content server 102 is preferably interfaced to a plurality of content providers of which content providers 104A, 104B, and 104C are representative. However, it will be appreciated by those skilled in the art that a single content provider may be interfaced with server 102. Furthermore, while content providers may be operated separately from system 100, those skilled in the art will also recognize that content provider database(s) 104 may be included as part of system 100. The content providers can be, for example, record companies, movie companies, television production companies, radio production companies, etc.

Users may access content server 102 through terminals 106 that are interfaced to server 102 through a communications link such as fixed telecommunication lines or communications network(s) 120, or through terminals 114 and 116, which are interfaced to server 102 over wireless communication links 118, or a combination of both. Content server 102 allows users to browse content available from content providers 104A, 104B, and 104C, and then select content items to be downloaded to terminals 106, 114 or 116.

Figure 2:
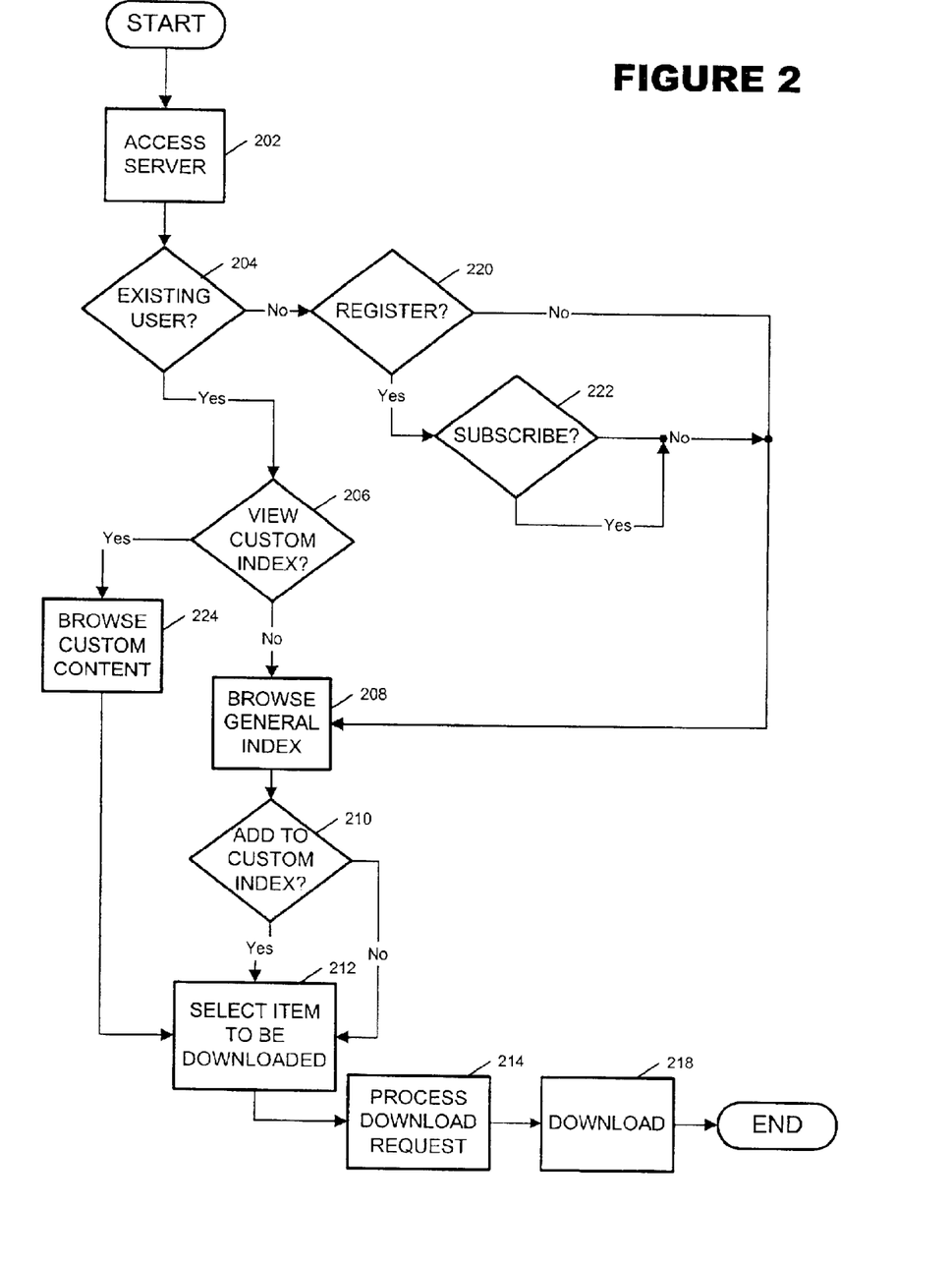
FIG. 2 is a flow chart illustrating a process for accessing content stored on a content delivery system, such as the system illustrated in FIG. 1, in accordance with one embodiment of the inventions.

FIG. 2 is a flow chart that illustrates the basic process involved when a user accesses content server 102. First, in step 202, a user accesses server 102. The user can access server 102 using fixed telecommunication lines or telecommunications network 120, for example. In this case, the user will most likely be using a desktop or laptop computer equipped with a communications modem. Fixed telecommunication lines or telecommunications network 120 can be a telephone line, cable line, fiber optic line, etc. It can also comprise a combination of the foregoing. In a typical embodiment, content server 102 is a server on the Internet. Thus, preferably the communication lines or network 120 form an Internet communication link between terminal 106 and server 102, with terminal 106 configured to use the appropriate Internet communication protocols, such TCP/IP, when communicating with server 102. Alternatively, the user can interface to server 102 using a wireless communication device such as terminal 114 or 116, examples of which are discussed more fully below. In this case, the terminal must be configured to implement the appropriate communication protocol required by the associated wireless communication link 118. Common wireless communication protocols that can be supported by a device such as device 114 or 116 include, for example, GSM, TDMA, or CDMA. The communication protocols required for a wireless communication link 118 will also be discussed in more detail below.

Once the user has accessed server 102, the user can browse the content that is available from content providers 104A, 104B, and 104C. First, however, server 102 preferably determines if the user is a registered user in step 204. The reason that the server is preferably used to determine if the user is a registered user is so that the server will have available to it as much information as possible about each user. In this way, the advertisements appended to downloaded content items can be highly targeted to the user. Therefore, if the user is not a registered user, e.g, he is a first time user, then content server 102 will preferably provide the user the opportunity to register in step 220. Registration preferably comprises obtaining personal information from the user, which is stored in a personal profile. Each personal profile can be stored by server 102 in a personal profile database 108, which can be, for example, stored in storage medium 122. Typical information stored in a personal profile includes address information and other personal information, such as age, gender, marital status, number of children, occupation, salary, etc.

Each new user is also preferably requested to enter information relating to product, service, and/or brand preferences. For example, if a content provider 104A, 104B, or 104C, provides music, then the user may be requested to enter his favorite bands and music genre. Additionally, the user may also be requested to select his favorite products, services, and/or brands in relation to the advertising information stored in advertising database 112. Advertising database 112 is a repository for digital advertising information provided by a plurality of advertisers. Content server 102 uses the information in database 112 to construct targeted advertisements that are appended to downloaded content items. Thus, when a targeted advertisement is generated by server 102 from the advertising information in advertising database 112, it may be generated from the information related to the products, services, or brands specified by the user and stored in the user's personal profile. That way, the advertisement is more likely to provide information about a product or service of interest to the user.

In a preferred embodiment, the user can also be presented with the option to purchase a subscription service in step 222. A typical subscription service would allow the user to pay a fee, which would cover a specified amount of content item downloads. As long as the user does not exceed the specified amount, content server 102 will not append any advertising to the content items downloaded by the user.

Once a user has setup his or her personal profile and/or subscribed to any available services, then he or she can browse the general index of available content items in step 208. Alternatively, if the user is a registered user, then preferably the user can be presented with the option of accessing a custom area 117 in step 206. Preferably, the user is permitted to create a custom area 117 on content server 102 that is personalized to the user's own tastes. This allows the user to select, organize, and quickly access the user's favorite content. For example, if one of content provides 104A, 104B, or 104C includes music, a user may be permitted to create, edit, and store in the user's custom area 117 a custom index or play lists of the user's favorite music. Alternatively, if one of the content providers 104A, 104B, and 104C provide television or movie content, the user can be permitted to create and store in the user's custom area 117 a personalized television or movie programming list that can be accessed anytime the user wants. In a preferred implementation, the user's custom indexes are automatically updated when relevant new content becomes available. For example, if a user includes a particular television show in the programming list, then the users' custom programming list may be updated each time a new episode is available for the show. Similarly, if a user includes a song or CD by a particular artist or band in the user's custom playlist, then the play list may be automatically updated whenever a new song or CD becomes available by the same artist or band. Alternatively, server 102 may generate a recommendation, as discussed below, if a new song from the same artist or band is available.

In the case of television, music, or music video content, terminal 106 may be a settop box on a digital television, or it may still be a personal computer. Advances in broadband technology make it possible to deliver a variety of audio and visual content to a variety of devices. Furthermore, the type of terminal used for certain content will become less and less important in the future.

Once a user has setup a custom area 117, which includes custom indexes such as custom play lists or television or movie programming lists, then the user can browse the custom indexes in step 224. Information related to the custom indexes can alternatively be stored in the user's personal profile.

Storing the user's custom indexes serves several purposes. One purpose is to ensure that the user's custom information is available to the user each time the user accesses content server 102. Another purpose is to aid in the generation of highly targeted, and therefore relevant, advertisements. A user's custom indexes may also be used to make recommendations for other content items that are available from content provider's 104. In a preferred embodiment, content server 102 tracks access information/statistics for all users by storing information pertinent to content accessed in tracking database 110. Content server 102 then uses this tracking information, or historical information, to generate recommendations and targeted advertising for particular users.

For example, tracking information may be used to make recommendations for other content items available from content providers 104. Thus, for example, if the user downloads songs from a particular artist, content server 102 may be used to generate a recommendation when a new song from this artist becomes available or to recommend another song by the artist that the user has not previously accessed. The recommendation may, for example, be sent instead of an advertisement. In other words, the recommendation may be attached to a requested content item and downloaded along with the item. The recommendation could be for a song, television program, movie, etc. Alternatively, the recommendation may take the form of an advertisement. Access information stored in tracking database 110 may also be used to recommend content that is similar to the content typically accessed by the user. For example, recommendations may be generated for musicians with similar styles or that are in the same genre as an artist typically accessed by the user.

Access information stored in tracking database 110 may be used in a variety of other useful manners as well. For example, if a user accesses a particular song, content server 102 can use historical information about content accessed by other users who also accessed that song. If the information reveals that a high percentage of these other users also requested another song, then content server 102 can recommend that song to the user. Variations on the use of access information in this manner may also be implemented, including, for example, only recommending the song if the user has never requested it. Alternatively, the song may be recommended if it has been requested by the user more than a first preset number of times and/or less than a second preset number of times. Further, if the information related to the other users reveals that certain advertising is highly targeted to those users, then content server 102 can target the same or similar adverting to the user. This concept can be extended by including similarities in the personal profile information provided by the users.

As will be discussed below, some embodiments of system 100 allow users to purchase content and to subscribe to other services such as chat room type services. Information related to these features, i.e., purchase history and chat room membership, can also be used to make recommendations and generate targeted advertising by looking at content accessed by, or advertisements sent to, users with similar histories or memberships. When a content item is recommended, preferably advertising is not attached the first time that item is downloaded by the user to whom it was recommended. This can act as an incentive for the user to try out the recommendation.

In a typical embodiment of system 100, the user can scroll through the index or indexes whether the user is browsing the general index (step 208) or the user's custom indexes (step 224). Additionally, the user can typically use a search feature to locate particular content. For example, a search feature can allow the user to type in the name of a song or musician. Content server 102 will then search for and locate the song or songs by the musician and will return a list that the user can browse in the same manner as browsing the indexes. As will be apparent to those skilled in the art, such search features may be extended to all forms of content provided by content provider 104. The extent and functionality of the browsing and searching functions are also impacted by the particular terminal being used to access content server 102. This impact is discussed more fully below in the discussion related to the different terminal that can be used in conjunction with the systems and methods for distributing targeted multimedia content and advertising.

In step 210, a user browsing the general index has the option of selecting content to add to his custom indexes stored in the user's custom area 117. After the user is done browsing the indexes and has added any items to his custom indexes, the user can select content items to be downloaded to his terminal in step 212. After the user has selected the item(s) to download, in step 214 content server 102 processes the downloaded request. In a preferred embodiment, content server 102 processes a downloaded request by checking the status of the content item(s) relative to the user in tracking database 110. Tracking data base 110 stores, for each content item relative to each registered user, a set of status indicators that indicate whether a particular user has free access to a particular content item. If the status indicators do not indicate that the user is entitled to free access of the selected content item(s), then the default is for content server 102 to associate advertisements in step 214 with the content item(s). The item(s), with associated advertisements are then downloaded to the user in step 218. The user, however, preferably has control over whether advertisements are associated or whether some other method of paying to download the selected content item(s) is used.

Figure 3:
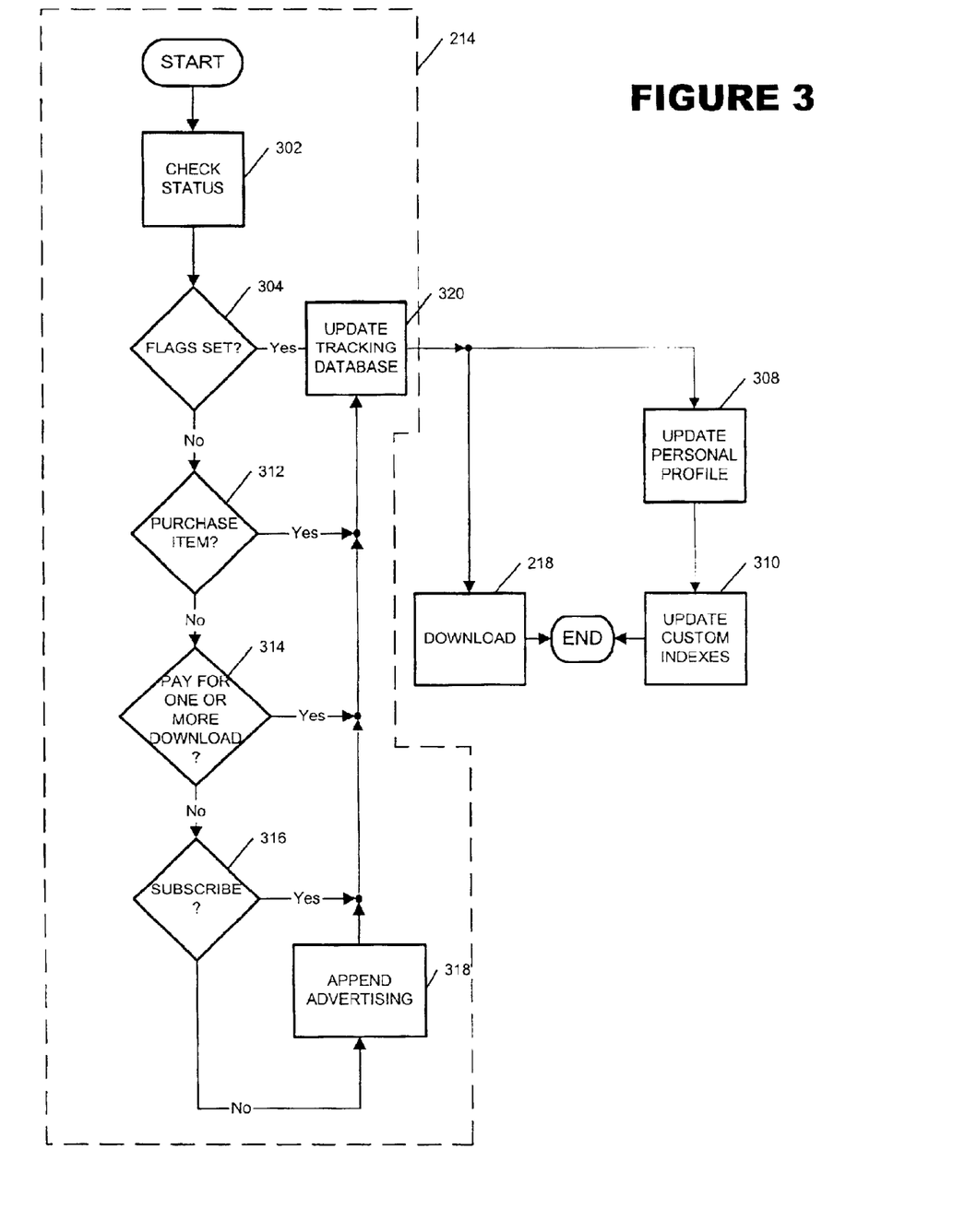

In FIG. 3, a preferred process is illustrated by which content server 102 may process a download request in step 214. As seen from the process illustrated in FIG. 3, the user is permitted to make selections as to how to pay for the cost of downloaded content items. Starting in step 302, content server 102 checks the status for content items selected by a user for download. This comprises checking the status indicators for the selected content items, in step 304, to see if the user is entitled to free access for the content items. If the user is entitled to free access, then the content items are downloaded (step 218) to the user without advertisement, i.e., step 318 is bypassed; however, in step 320, tracking database 110 is updated to reflect the user's access to the content items. Therefore, the user may or may not receive free access, i.e., skip step 318, the next item the user accesses the same content items.

After tracking database 110 is updated in step 320, the user's personal profile is preferably updated in step 308 with information relating to the access of the content items. In step 310, the content items may be added to the user's custom indexes and/or stored in the user's custom area 117 so that they are readily available to the user the next time the user access content server 102.

If the status indicators do not indicate that the user is entitled to free access of the selected content items, then the user is preferably presented with options to pay to download the content items. For example, in step 312, the user may be given the option to purchase unlimited access to the content items. In the event the user selects to purchase unlimited access to an item, then the item is downloaded (step 218) to the user without appending an advertisement in step 318. Further, content server 102 will update tracking database 110, in step 320, to indicate that the user has purchased unlimited access to the content item. Therefore, the next time content server 102 checks the status (step 302) for that content item relative to that user, it will see that the user is entitled to free access.

In the foregoing discussion, the term "purchased" is used in the sense of the user purchasing ownership of the content item, so that the user may gain access to the content item as many times as the user wants. User's may also be given the option of purchasing a single access or a select number of accesses to the selected content item in step 314. Such a purchase may or may not change the state of the status indicator for that content item in tracking database 110. For example, if the user has paid for only a single access, the status of the status indicator would not typically change. In the event that a user has selected a number of accesses to the selected content item, however, the status indicator is typically set so that content server 102 sees that the user is entitled to free access. A counter may be used so that the state of the status indicator is changed back for that item relative to that user after the user has downloaded the selected content item the number of times for which the user has prepaid. In a variation of this implementation, a second counter may be used so that after a user has purchased a predetermined number of accesses to a particular content item, the user is treated as having purchased unlimited access. In this case, after the user has paid to access the content item the predetermined number of times, the state of the status indicator is set so that the next time the user accesses the content item the content server will see the user is entitled to free access.

In a similar implementation, the user may select to purchase a subscription that covers the selected content item in step 316. This step involves essentially the same methods as discussed in relation to step 222 in FIG. 2; however, if the user did not choose to sign up for a subscription at that time (step 222), then the user may be given another opportunity now that the user has decided to download content. A typical subscription service would allow the user to pay a fee that would typically cover a specified dollar amount of content item downloads or cover unlimited downloads for a particular type of content over a specified period. If a user has purchased a subscription, either at step 222 or step 316, that covers the selected content item, then a status check (step 302) will indicate to content server 102 that the user is entitled to free access and step 318 will be bypassed for the selected content item.

As discussed above, content server 102 may make recommendations to a user for various content. Preferably, advertisements are not appended when a user first accesses a recommended content item. Nor should the user be required to pay in order to determine if he likes the recommendation or not. Therefore, in a preferred implementation, when an item is recommended to a user, tracking database 110 is updated to indicate that the user is entitled to free access. When the user selects the recommended content item, the status check (step 302) will indicate that the user is entitled to free access. After this first access, however, the status indicator is preferably reset, so that the user will have to pay or receive advertising the next time the user accesses the content item.

A similar process preferably occurs when an item is bought as a gift for another user. In other words, the status for the gifted item should be changed in tracking database 110 for the user for whom the content item is purchased to reflect that the user is entitled to free access. One variation on this implementation is to allow a user to purchase a certain number of downloads for another user. In this case a counter can be used to control the status indicator. Therefore, the state of the status indicator for the content item is changed when the gift is bought. Once the counter indicates that the user has accessed the content item the prepaid for number of times, then the status stored in tracking database 110 reverts to its previous state.

If the user does not choose to pay for the content in one of the manners discussed in relation to steps 312, 314, or 316, and if the item is not a recommendation or a gift, then content server 102 will append an advertisement to the selected content item in step 318. Therefore, while the user can subscribe and/or purchase content, it is envisioned that the majority of content will be accessed for free, with the cost of the service being subsidized by the advertising that is associated with the content in step 318. It should be noted that establishing a personal profile (step 220) and subscription information (step 222) is preferably accomplishable at any point in the process. The key, however, is that the personal profile needs to be set up before the system begins downloading content (step 218). This way, content server 102 can properly perform step 214, i.e., determining whether to associate targeted advertisements with the downloaded content.

Essentially, each content item that is not purchased and that is downloaded has an advertisement associated with it in step 318. The advertisement is typically in the same format as the content item with which it is associated. The format is also impacted by the functionality of the terminal (see below); but, for example, if the content item is an MP3 music file, then the advertisement is typically an audio message in MP3 format. The message is preferably short, for example, 5 seconds, and will be appended to the front or back of the music file, i.e., the advertising digital audio data will be appended to the front or back of the music digital audio data. This way, the advertiser will be assured that the user hears the advertisement as opposed to banner ads, for example, which are easily ignored.

In the typical scenario, the user will download an entire play list or CD; therefore, an advertisement is preferably appended to the front or back of each song. Thus, there is the potential for large quantities of advertising to be delivered with each download. It will be appreciated, however, that advertisements may be appended in a large variety of ways depending on the number of songs or content items to be downloaded. For example, advertisements may be appended to every other or every third song. A random number generator may also be used to append selected targeted advertisements to randomly selected content items. The method of appending can also very depending on the type of content. For example, if the content item is an audio book, then a short advertisement can be appended to the end of each chapter, or after a predefined number of pages If the selected content is television content, then an advertisement or series of short advertisements can be appended to the beginning and/or ending of each television show, or at appropriate locations during the show. The same method can be used for movies, music video, or radio programming.

With regard to multimedia content such as movies or television programming, the possible formats for the advertisements is obviously greatly increased. Although, as mentioned, the possibilities are also limited by the particular terminal being used. For example, the advertisement could include video, audio, graphics, text, etc., depending on the type of content being downloaded and the type of terminal being used. Importantly, in addition to being highly targeted, the advertisements are preferably short so that they are unobtrusive to the user. Moreover, audio is typically a key component to the advertising, because the user is more likely to "notice" an audio advertisement or an audio portion of an advertisement. If the advertisement is purely visual, i.e., text, graphics, or video, then it may not be noticed if the user is looking away or not paying close attention.

While the general process is to attach at least one advertisement to each content item that is being downloaded, preferred embodiments provide that after a particular user has downloaded a particular content item and received an associated advertisement a predetermined number of times, the user can thereafter access the content item without having advertisement attached. Essentially, the user has the ability to earn free access to content by receiving the advertisements. This is one more way to minimize the impact of the advertising on the user. While there is not necessarily a perfect threshold for the number of accesses needed to gain free access to particular content, the threshold needs to balance the goals of the advertisers to reach potential clients, the goals of the user to have free access without interfering advertisement, and the goal of system 100 operators and the content producers to make money. If the advertising is sufficiently short and highly targeted, however, then users will likely have a higher tolerance for the advertising than most consumers have for current modes of advertising.

Tracking database 110 tracks whether a sufficient amount of advertising has been received by a particular user in association with a particular content item. Thus, after step 318, tracking database 110 is updated in step 320. Further, regardless of how the cost of the download is accommodated, the personal profile and/or custom indexes for the user may be updated in steps 308 and 310, respectively.

Tracking database 110 is organized to track, the content items accessed by a particular user. A purpose of tracking database 110 is to track whether a particular user is entitled to free access for any of the available content items. It will be apparent that there are many possible methods and database configurations available to accomplish this task; however, in a preferred embodiment, tracking database 110 comprises a set of "registers" or "fields" for each registered user. The set of registers or fields includes a register or field for each available content item, and each register or field contains a status indicator to indicate whether the particular user is entitled to free access for the content item associated with the register or field. The status indicator can be set or unset to indicate an entitlement to free access depending on the embodiment. For example, if a user can earn free access to a particular content item by downloading the content item with appended advertising a certain number of times, then once the threshold number of downloads is reached, the status indicator is set, or unset. Similarly, if a user has paid to download a content item, a sufficient number of times, then the status indicator can be set or unset to indicate that the user is now entitled to download the content item for free. And of course, if the user purchases unlimited access to the content item, buys a subscription covering the content item, or if the item is bought as a gift for the user, the status indicator for that item is set or unset to indicate that the user is entitled to free access.

By set or unset, it is meant that the state of the status indicator can be set to a certain value or state, e.g., a logic "1", or unset, e.g., a logic "0", depending on the implementation of tracking database 110.

In certain embodiments, the status indicator may only be temporarily set. For example, if a user has paid for a certain number of downloads, then the status indicator is set until the user has reached the paid for number of downloads. Once the user has used up his paid for downloads, the state of the status indicator may be changed to reflect that the user is no longer entitled to free access. Also, if the content item is recommended to the user, the status bit may be set to indicate that the user has free access to the content item. Typically, however, the state of the status indicator will revert after one download so that the user only receives one free access. This provides the user the opportunity to try a recommended item once before deciding whether to purchase the item or whether to download the item again with advertising appended, etc.

In an alternative embodiment, tracking database 110 may include more than one register or field per content item per user. For example, one field may track whether a particular user has reached an advertising threshold for a particular content item, while another field tracks whether the user has paid for enough downloads to have earned free access to the content item. Other fields may track, for example, whether the item has been recommended to a user, whether the item is a gift, or whether the item is covered by a subscription. Content server 102 may then check each field for a particular content item, or the fields can be combined into one status indicator, such as, for example, by ORing the contents of the fields to produce a combined status indication.

It is possible, in some embodiments to integrate tracking database 110 with the personal profile database 108. In this case, tracking database 110 is maintained on a per user profile basis and the information as to what content has been downloaded for a particular user is shared between the functions related to the two databases.

All of the databases 108, 110, and 112, can be stored in storage medium 122.

In a typical embodiment, content providers 104A, 104B, and 104C are interfaced to content server 102 through the Internet. However, a proprietary or other communication network may also be used.

In one embodiment of system 100, users may access content server 102 over a fixed network connection, such as communication link 120, using a terminal 106. Typically, terminal 106 is a personal computing device, such as a personal computer or a laptop that includes a data modem (not shown) for communicating over communication link 120. In a preferred embodiment, content server 102 is accessed by terminal 106 via an Internet connection over communication link 120. In this case, terminal 106 would use an Internet browser, or graphical interface, to access the information contained on server 102. Using the browser, the user can browse the indexes, search for content, enter information into their user profile, sign up for subscriptions or other services, etc. The user may even be provided with tools that allow the user to customize the browser interface to suit their own tastes and organize the display of information in a manner that suits them. Information relating to the customized interface and organization is typically stored in the user's personal profile stored in database 108. In some embodiments, the user accesses the main "page" presented by content server 102. The user can then access their own custom area 117, the appearance of which they can also customize to suit their preferences in the manner discussed.

User's are also preferably allowed to interface with server 102 through a wireless device that interfaces to server 102 over a wireless communication link 118. There are many wireless devices that are available or soon will be, that incorporate Internet browsers. For example, PDAs and cellphones are increasingly wireless web enabled. In fact, in Japan the most common way to access the Internet is using NTT DoCoMo's wireless Imode™ service. In Europe, WAP services are typically used for wireless web access. Typically, the device, such as device 114, is interfaced over a wireless communication channel 118 with a service provider's wireless communication system. The system then interfaces with the Internet through some type of packet data communication switch. Depending on the embodiment, the packet data communication switch may need to perform format conversion on the communication. This is because wireless communication networks have traditionally used circuit switched communication channels that do not support packet data. Therefore, the packet data communication switch may need to perform conversion from packet data to circuit switched data and vise versa. Other wireless communication systems, like Imode™ for example, use packet data communication channels, and no conversion is necessary.

There are a variety of wireless communication systems that can be utilized by a wireless device to access content server 102 including satellite communication systems. These systems employ a variety of communication protocols both for radio control, e.g., channel setup and access, and for communicating data. For example, common radio control protocols are GSM, TDMA, and CDMA. The data communication protocol will depend on, among other things, whether the system employs circuit switched communication channels to communicate data or packet data communication channels. Some common wireless data communication protocols for circuit switched systems are Short Messaging Service (SMS), Circuit Switch Data Service (CSDS), and High Speed Circuit Switch Data Service (HSCSDS). Common wireless data communication protocols for packet data systems are General Packet Radio Service (GPRS) and EDGE service.

Devices, such as device 114, which include browsers work in much the same manner as terminal 106. Although, the form of the data may need to be modified depending on the capabilities of the wireless service and the browser incorporated in device 114. New wideband technologies, however, promise to make wireless Internet access comparable to regular Internet access. Once the content is downloaded to a device 114 or terminal 106, it is played for the user. Therefore, these devices must include a media player (not shown) capable of playing the content downloaded. For audio, most computers and cellphones include audio circuitry that can be used to play downloaded audio content. Similarly, video is not a problem on most PCs or laptops; however, video can be a problem on a device 114, because such devices typically do not include large, high resolution displays. Nor is the bandwidth needed to download video typically available. But just as terminal 106 can be a device particularly suited to play certain content, like a settop box on a digital television, a custom media playing device 116 can be used to access content server 102 over a wireless communication link 118. For example, media playing device 116 can be a custom device for playing digital audio files, such as MP3s, that is designed to sit on a desk top or in a car. Preferably, the device is portable so it can be moved from the desk top to the car.

Figure 4:
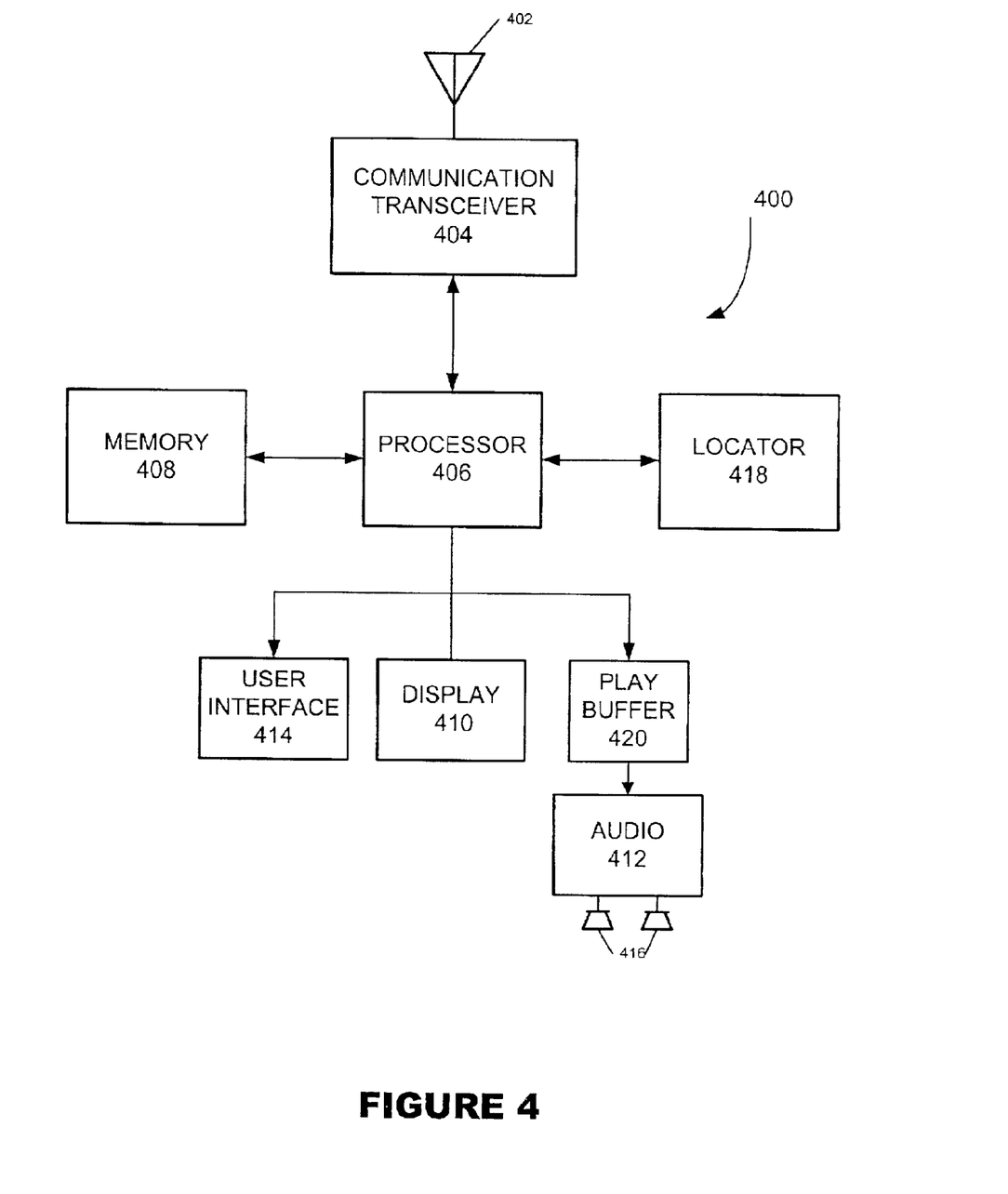
FIG. 4 is a block diagram illustrating an exemplary terminal used to access content from a content delivery system, such as the system in FIG. 1, in accordance with one embodiment of the inventions.

FIG. 4 illustrates an example device 400 that is configured to play content received over a wireless link 118. Device 400 can be a device like device 114, e.g., a PDA or cellphone, or it can be a custom media playing device like device 116. Device 400 includes wireless transceiver 404 for communicating with a wireless communication system over communication link 118 via antenna 402. Processor 406 controls the operation of device 406 including the operation of transceiver 404. Memory 408 stores communication and radio control software used by processor 406 to communicate over link 118 and to control the operation of transceiver 404, respectively. Memory 408 also stores application software used by processor 406 to play content downloaded to device 114 or 116.

Memory 408 also stores the content downloaded from content server 102. Preferably, however, memory 408 only stores the content temporarily. This way there is no fear of unauthorized copying, because the content does not remain in memory 408 to be copied. Alternatively, encryption and/or license key techniques may be used to secure the content from unauthorized copying. If the size of memory 408 is constrained, then content server 102 may segment the content and the associated advertisements before downloading the content to a device. Content server 102 then downloads the segments one at a time. This may be important for wireless devices, such as devices 400, because segmenting only requires enough memory 408 to store the smaller segments. This reduces the memory requirement for such devices making them smaller and more affordable, and removing a major hurdle related to wireless downloading of content. Alternative embodiments may stream the content to device 400, which also requires little to no memory. But, unfortunately, streaming is bandwidth intensive. In embodiments where bandwidth is limited, which is the case for most wireless communication systems in existence today, the method of segmenting the content balances both memory constraints and bandwidth constraints. It should also be noted that for devices for which memory constraints are not an issue, e.g., a computer connected to server 102 over the Internet, all of the content can be downloaded at once. As a result, the segmenting method is primarily directed to wireless access embodiments. Although, segmenting may provide benefits and can be used regardless of the terminal or communication link. For example, even fixed line Internet connections can be bandwidth limited. Downloading all of the content at once may create bandwidth problems just like streaming creates bandwidth problems. Therefore, segmenting can alleviate the bandwidth problems in fixed communications networks as well.

If segmenting is used, a key issue is synchronizing the segment downloads so that the user is not aware of the piecemeal process. Therefore, in one embodiment, a play buffer 420 is used to load the segment that is about to be played from memory 408. When a segment is loaded into play buffer 420, device 400 will communicate via communication transceiver 404 with content server 102, and request that content server 102 to send the next segment. When the next segment arrives, it is loaded into memory 408. The segment will remain in memory 408 until it is time to load it into play buffer 420, at which point device 400 will request a new segment and load it into memory 408. In this manner, the requirements for memory capacity can be kept to a minimum, as can the impact on the wireless communication systems bandwidth. This method of segmented downloading will work regardless of the type of device engaged in the downloading.

In embodiments where device 400 is configured to play audio files, the audio data, segmented or not, is sent from play buffer 420 or memory 408 to audio circuit 412. A typical audio circuit will contain a digital-to-analog converter (DAC) to convert the digital audio file into an analog signal that is amplified and played to the user via speakers. For stereo audio, device 400 will use a balanced pair of speakers 416 and a balanced audio paths through audio circuit 412. Display 410 displays information to the user. Display 400 is preferably sufficient to display the indexes and play lists. There is also typically a user interface that includes mechanisms that allow the user to scroll through the index, such as a turning knob, and to select songs to download, such as buttons or input keys. In some embodiments, display 410 is also used to display advertisements. These advertisements can be video clips, graphics, or text and can be synchronized to audio sent to audio circuit 412 or not. For example, display 410 may be used to show images that correspond to audio content downloaded by the user, such as a picture of an artist or band or a picture of a CD cover that corresponds to the downloaded audio content. In some implementations, device 400 can be used to download and play video files, such as movies, television programming, or music videos.

In some embodiments, device 400 can also include a locator 418 that provides position related information regarding device 400. For example, in one embodiment, locator 418 is a GPS receiver. The position information is then communicated to content server 102. Therefore, the position information can be updated periodically using some predetermined update period. The position related information is then used by content server 102 to provide targeted advertising based on the position of device 400. For example, if a user downloads content, content server 102 can select advertising from companies located in the area of the user to be associated with the content as it is downloaded. The position information may be stored by content server 102, or it may be checked by content server 102 prior to each download, or some combination of these methods.

The content provided by content providers 104 can be stored in a content database in storage medium 122. This, however, typically requires large amounts of storage. Therefore, the content database may be stored in a separate storage medium (not shown) interfaced to content server 102. In another embodiment, the content can be stored on content providers 104 and accessed as needed; however, this can create bandwidth problems for the content providers if there are a large number of users. Therefore, the preferred method is to store the content in a content database in storage medium 122 or some other storage medium. To ensure that the content providers are paid for the use of their content, content server 102 tracks the number of accesses for each content item. It is then envisioned that the operator of system 100 would pay the content providers a fee from the money collected form the advertisers who provide the advertising information stored in advertising database 112, and from any subscriptions or purchases. Of course, if a user has earned free access to a particular content item, then the content provider would not be owed a fee for any subsequent access to that particular content item by that user. There are of course alternative compensation schemes. For instance, the content providers can negotiate a flat rate or percentage compensation from the operator of system 100. The amount of the flat rate or percentage will then dictate the rate advertisers pay and the threshold number of accesses to a particular content item required to earn free access to that item.

Figure 5:
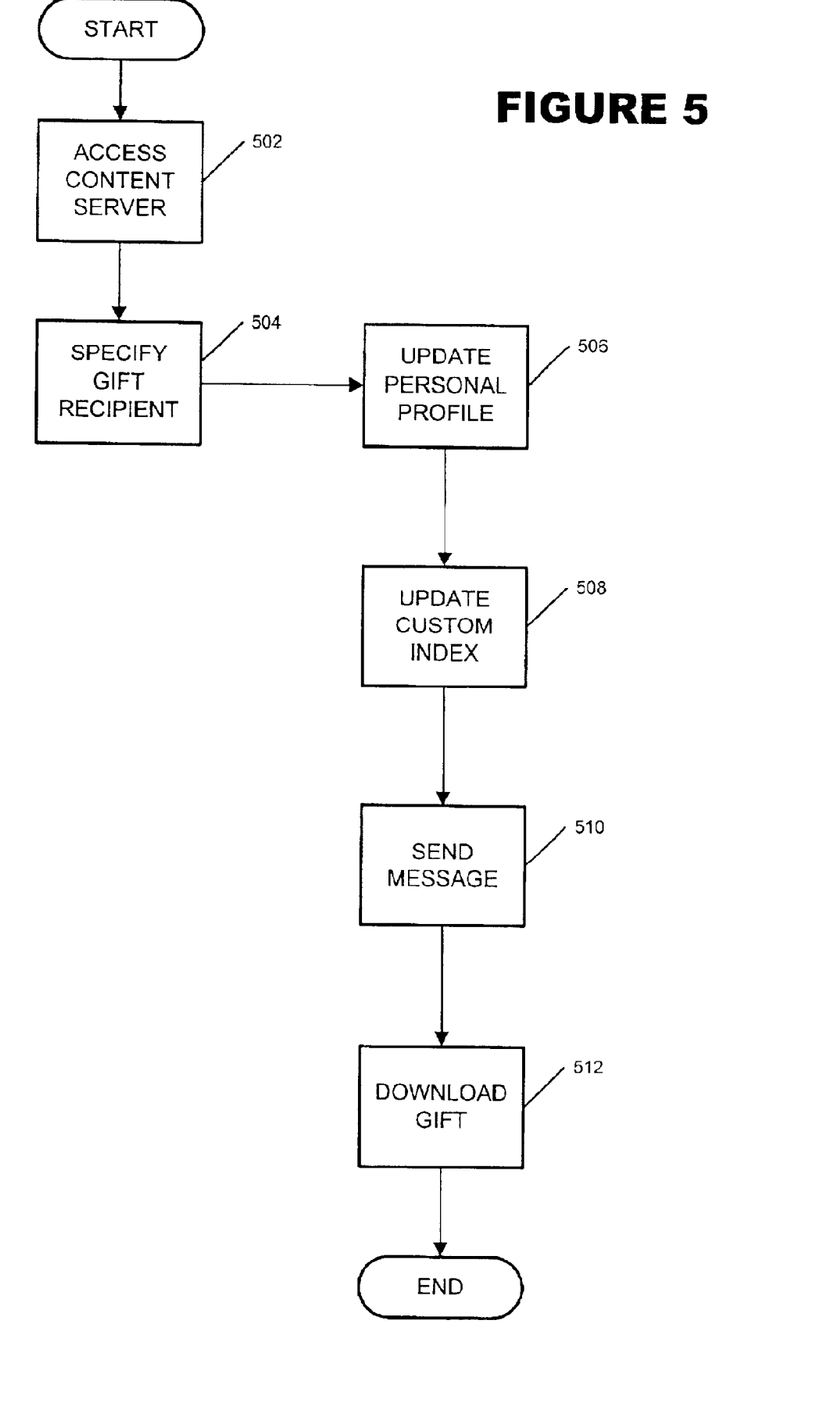
FIG. 5 is a flow chart illustrating a process for purchasing content stored on a content delivery system, such as the system illustrated in FIG. 1, as a gift for a registered user of the content delivery system.

In addition to purchases and subscription services, system 100 can also provide other services to users who access content server 102. For example, a related service is the ability to send content items as gifts to registered users. For example, a user, preferably whether a registered user or not, could access content server 102 and browse the indexes as illustrated by step 502 in FIG. 5. Once this user finds a content item suitable as a gift, he can specify a registered user to receive the gift in step 504. Content server 102 would then add the content item to the registered user's custom index and update their personal profile and custom indexes in steps 506 and 508, respectively. The next time the registered user accesses content server 102, and/or their custom area 117, the user would receive a message indicating he has received the gift (step 510). In one embodiment, the person sending the gift can even setup a customized message that is delivered to the subscriber receiving the gift. In another embodiment, content server 102 will communicate a message to the user's terminal telling them they have received a gift and that they should access content server 102 to receive it. Of course, when the user downloads the gifted content item, there is no need to attach advertising since the item (step 512) has been purchased.

In a similar implementation, a user can redirect content the user has downloaded to other registered users. This is similar to content server 102 making a recommendation or a user purchasing a content item as a gift for another user; however, in this case, the user to whom the content item is redirected would not be entitled to free access. Therefore, if the user would like to download the item, the user would preferably be required to pay for the download in some manner or to receive advertising with the download. In certain implementations, the redirected content may be accompanied by a message. The message may be created by the user redirecting the content, or it may be generated by content server 102 to inform the user that content has been redirected to them.

In order to purchase content, subscribe to certain service, or buy gifts for other subscribers, the user typically must provide billing information. In one embodiment, the user can input charge account information through keys on the user's terminal. The charge account information may be a credit card number, a debit card number, or some other financial account information, and may include residence information for billing purposes. Alternatively, the charge account information may be stored in the user's personal profile. It should be noted that sending account information over the Internet or over wireless communication links can lead to concerns over security of the information. To allay these concerns, third party verification and/or security services can be used to improve the security related to the account information. In addition, public key cryptography can be used to ensure that the transaction is a secure transaction.

Cryptography uses mathematical algorithms to encrypt and decrypt data. The algorithm is individualized for a particular person, application, or service through a "key." Public key encryption refers to a certain type of algorithm and a certain method of individualization. One example of a public key cryptography approach is public key infrastructure (PKI). This approach uses a known, widely distributed public key and a different private key known only to the person, application, or service that owns the keys to encrypt and decrypt messages. PKI is explained in RSA Security's white paper entitled "Understanding Public Key Infrastructure (PKI)," available at http://www.rsa.com and incorporated herein by reference in its entirety. An alternatively method to ensure secure transactions involving the user's account information is for the operator of content delivery system 100 to track purchases by the user and bill the user for those purchases.

Also, voice recognition may be used to supply some level of security depending on the implementation of system 100 and on the type of device used to access content server 102.

In some embodiments, content server 102 can host discussion groups or chat rooms. For example, content server 102 can allow users to join "clubs" wherein they can exchange information with each other after logging on to content server 102. Typically, a club or chat room has its own area on content server 102 that the members can access. Accessing the special area may require a password or membership ID, or it may be open to anyone. In some embodiments, users can send messages to each other. Content server 102 will store the message in the users custom area 117 so that the user can receive the message when the user accesses content server 102. In other embodiments, content server 102 will send the message to the user's terminal.

Another feature that may be included in system 100 is the ability for a registered user to act as a content provider. For example, a user may be able to make available to other registered users content created by the user or for which the user owns copyrights. Depending on the implementation, content provided by a user may be uploaded into a content database stored in storage medium 122, or it may reside on the user's terminal, such as in the hard drive of a personal computer. In one implementation, content provided by a user in this manner is treated the same as any content, with the user receiving compensation collected by the operator of system 100 on a per access basis. Alternatively, a user uploading content is preferably provided the option of making the content freely available to other users. Moreover, the user himself is preferably entitled to free access to any content that the user uploaded. Therefore, tracking database 110 may track whether a user is entitled to free access to content items they themselves uploaded.

Content server 102 may also have the ability to substitute public service announcements for advertisements when downloading content. For example, if there was an emergency, public warnings may be substitute for advertisements.

Therefore, the systems and methods for distributing multimedia content and advertising provide a cost effective and flexible way for users to access their favorite content anytime, anywhere. Moreover, content providers are assured adequate compensation for their content and protection from unauthorized copying and distribution of their content.

While embodiments and implementations of the invention have been shown and described, it should be apparent that many more embodiments and implementations are within the scope of the invention. Accordingly, the invention is not to be restricted, except in light of the claims and their equivalents.

What is claimed:

1. A method of delivering content from a content delivery system to a user's terminal over a communication link, comprising:

receiving a request from a user of the content delivery system to download a content item to the user's terminal over the communications link;

checking with a tracking database the status of the content item relative to the user and determining if the user uploaded the content item and access to the content item by the user is free;

in response to the status check in, providing at least two payment options to the user over the communication link after the results of the status check indicate that access to the content item is not free for the user, one of the payment options being the option to receive advertising with the content item in lieu of paying money to receive the content item;

receiving a payment option selection from the user over the communication link;

preparing the content item for download in accordance with the selected payment option, wherein preparation of the content item for downloading includes appending a targeted advertisement to the content item when the user selects to receive advertising as the payment option; and downloading the prepared content item from the content delivery system to the user's terminal over the communications link.

2. The method of claim 1, wherein the advertisement is selected based on personal information relating to the user.

3. The method of claim 1, wherein the other payment option provided to the user is to purchase unlimited access to the content item.

4. The method of claim 1, wherein the other payment option provided to the user is to pay for a predetermined number of accesses to the content item.

5. The method of claim 1, wherein the other payment option provided to the user is to purchase a subscription covering the content item.

6. The method of claim 1, wherein the other payment option provided to the user is to purchase the item as a gift for another user.

7. The method of claim 1, wherein checking the status of the content item comprises checking one or more status indicators in a tracking database, and wherein updating the status of the content item comprises updating the status indicators in the tracking database relative to the user.

8. The method of claim 7, wherein updating the status of the content item relative to the user comprises storing an indicating that the user has purchased unlimited access to the content item, paid for a predetermined number of accesses to the content item, purchased a subscription, purchased the content item as a gift, or received advertising with the download on the content item.

9. The method of claim 1, comprising determining if the user is a registered user and, in the event that the user is not a registered user, registering the user, wherein registering the user comprises obtaining and storing personal information relating to this user.

10. The method of claim 1, wherein checking the status of the content item comprises determining if the user has previously paid to download the content item a predetermined number of times so that the current access is free.

11. The method of claim 1, wherein checking the status of the content item comprises determining if the user has previously purchased unlimited access to the item.

12. The method of claim 1, wherein checking the status of the content item comprises determining if the content item is covered by a subscription purchased by the user.

13. The method of claim 1, wherein checking the status of the content item comprises determining if the content item is a gift to the user.

* * * * *